United States Patent
Hors et al.

(10) Patent No.: US 7,681,842 B2
(45) Date of Patent: Mar. 23, 2010

(54) DEVICE FOR ARTIFICIALLY RESTORING AN OPPOSING FORCE FOR A DEVICE FOR REMOTELY CONTROLLING AIRCRAFT CONTROL SURFACES

(75) Inventors: Daniel Hors, Puteaux (FR); Yvon Joncour, Osny (FR)

(73) Assignee: Sagem Defense Sécurité, Paris (FR)

( * ) Notice: Subject to any disclaimer, the term of this patent is extended or adjusted under 35 U.S.C. 154(b) by 593 days.

(21) Appl. No.: 11/631,083

(22) PCT Filed: Jun. 27, 2005

(86) PCT No.: PCT/FR2005/001622

§ 371 (c)(1),
(2), (4) Date: Dec. 28, 2006

(87) PCT Pub. No.: WO2006/010842

PCT Pub. Date: Feb. 2, 2006

(65) Prior Publication Data

US 2009/0049948 A1  Feb. 26, 2009

(30) Foreign Application Priority Data

Jun. 29, 2004  (FR)  ................................. 04 07168

(51) Int. Cl.
*B64C 13/04* (2006.01)
(52) U.S. Cl. .................. 244/234; 74/471 XY
(58) Field of Classification Search ......... 244/220–223, 244/225, 75.1, 234; 74/471 XY; 267/73; 345/156–184, 161, 158
See application file for complete search history.

(56) References Cited

U.S. PATENT DOCUMENTS

| 2,394,384 | A | * | 2/1946 | Horstmann | ................... 74/625 |
| 2,695,145 | A | | 11/1954 | Lear et al. | |
| 4,069,720 | A | * | 1/1978 | Thor | ........................ 74/471 R |
| 4,713,007 | A | * | 12/1987 | Alban | ........................ 463/37 |
| 5,513,543 | A | | 5/1996 | Carlson et al. | |
| 2009/0189024 | A1 | * | 7/2009 | Hors et al. | ................... 244/221 |

FOREIGN PATENT DOCUMENTS

EP    0 659 640 A1    6/1995

* cited by examiner

*Primary Examiner*—Richard W L Ridley
*Assistant Examiner*—Terence Boes
(74) *Attorney, Agent, or Firm*—Marshall, Gerstein & Borun LLP

(57) ABSTRACT

A device for artificially restoring an opposing force for a device for remotely controlling an aircraft control surface, the device comprising: an actuator member (1) mounted to pivot about an axis (2) and entrain a rotary shaft (3); a stationary finger (8) parallel to said shaft (3) and supported at a radial distance from the shaft; a moving finger (5) secured to the shaft and supported at the same radial distance as the stationary finger, both fingers being parallel to the shaft; a slab (9) supported at the same radial distance as the fingers and disposed beside them; a first spring (11) between the stationary finger and the slab; and a second spring (10) between the moving finger and the slab.

12 Claims, 4 Drawing Sheets

DEVICE FOR ARTIFICIALLY RESTORING AN OPPOSING FORCE FOR A DEVICE FOR REMOTELY CONTROLLING AIRCRAFT CONTROL SURFACES

The present application is filed under 35 U.S.C. §371 as a U.S. national phase application of PCT application no. PCT/FR2005/001622, which was filed Jun. 27, 2005. The aforementioned PCT application claimed benefit of priority of French Patent Application No. 0407168, which was filed Jun. 29, 2004. The entire text of each of the aforementioned applications is incorporated herein by reference.

The present invention relates to the field of remotely controlling control surfaces of an aircraft, such as an airplane, a helicopter, . . . , and the invention relates more specifically to improvements applied to such devices, commonly referred to as control columns or sticks, provided for controlling the roll (banking) control surfaces and/or the pitch (elevator) control surfaces; more specifically, the invention relates to improvements applying more particularly, although not exclusively, to devices in which the stick is of small size (mini-stick) and is structurally associated with an armrest so as to capable of being actuated with the arm resting on the armrest, merely by moving only the wrist.

A control device of the type to which the invention relates comprises an actuator member (knob, pedal) suitable for pivoting about an axis on either side of a neutral position and for controlling a modification to the flying surfaces of the aircraft in terms of roll and/or pitch, and for this purpose it is capable of pivoting about two main axes that are perpendicular (Cardan joint type mount). Mechanical or hydraulic type control systems act in a structurally intrinsic manner to generate opposing forces that are perceived by the pilot on moving the stick. In contrast, in electrical or electronic type control systems, no opposing force is generated naturally and it is necessary to add an auxiliary device associated with the main control specifically for generating an opposing force that can be perceived by the user, as a function of the angular displacement of the actuator member.

Furthermore, the rotary movements of the wrist do not take place in symmetrical manner both to the right and to the left. Unfortunately, it is specifically the rightward or leftward displacement of the mini-stick that controls the roll control surfaces. It is therefore necessary to constitute the control device in such a manner that aircraft roll maneuvers remain independent of the physiological asymmetry of the rotary movements of the pilot's wrist.

An object of the invention is to propose an improved device that is better adapted, and in particular more compact, than present devices to response curves that are various and/or asymmetrical, these improvements finding a preferred although non-exclusive application in association with mini-sticks for pilots.

To these ends, the invention provides a device for artificially restoring an opposing force in a device for remotely controlling aircraft control surfaces, said device comprising an actuator member suitable for pivoting about an axis and entraining a rotary shaft, which device, when arranged in accordance with the invention, is characterized in that it comprises:

- a stationary, first finger parallel to said shaft and supported at a radial distance from said shaft;
- a second finger secured to said rotary shaft and parallel thereto, said second finger being supported at substantially the same radial distance from said shaft as the first finger;
- a slab supported at the same radial distance as the first and second fingers and extending beside the two fingers;
- a first spring interposed between the stationary, first finger and the slab; and
- a second spring interposed between the moving, second finger and the slab.

By means of these dispositions, the device can occupy three functional positions, namely:

- a neutral position occupied in the absence of any force being exerted on the actuator member, in which the slab is held pressed laterally simultaneously against both fingers under the action of prestress of the two springs;
- a position pivoted in a first direction away from the neutral position through a variable angle, in which the moving, second finger is entrained relative to the stationary, first finger away from the slab and is subjected to the return force of the second spring interposed between said second finger and the slab; and
- a position pivoted in a second direction, opposite to the preceding direction, away from the neutral position through a variable angle, in which the moving, second finger is entrained relative to the stationary, first finger to the same side as the slab, entraining it therewith, and is subjected to the return force from the first spring interposed between the first finger and the slab.

In particular, and preferably, it is possible to provide for the two springs to possess different stiffnesses: thus the opposing force is made to be different depending on the displacement direction of the actuator member, thereby making it possible in particular to adapt the opposing force as a function of the direction of rotation of the wrist of the pilot holding the mini-stick.

Optionally, if so desired, it is possible to provide for at least one of the springs to possess stiffness that varies as a function of its deformation, so that the pilot feels the position of the control member (coming close to the end of it stroke, for example) or perceives the crossing of one or more predetermined thresholds, or perceives an opposing force that varies progressively.

In practice, in order to constitute a device that is more compact, it is advantageous for both springs to be torsion springs, in particular helical springs, which are disposed coaxially about the shaft.

In a preferred embodiment, the slab and the two springs situated on either side thereof are made in the form of a unitary assembly. It then becomes possible for the slab and the two springs on either side thereof to be made in the form of a single block with the springs being machined in the block.

As can be seen from the above, the dispositions in accordance with the invention as set out above find an advantageous application when the actuator member is a manually-actuatable knob or stick, in particular of the so-called mini-stick type, and in particular when it is functionally associated with controlling roll control surfaces.

The structure of the device in accordance with the invention also provides the additional advantage of enabling the actuator member to operate actively by applying motor drive to the stationary finger so that in an automatic pilot mode, the control member follows the maneuvers of the aircraft as controlled by a computer or by the pilot (when the actuator member is a co-pilot's control member and not in use). To this end, provision is made for the device to include motor-driven displacement means functionally associated with the stationary finger and suitable for modifying the position of the stationary finger.

The invention can be better understood on reading the following detailed description of certain preferred embodiments given solely as non-limiting examples. In the description, reference is made to the accompanying drawings, in which.

Figure 1:
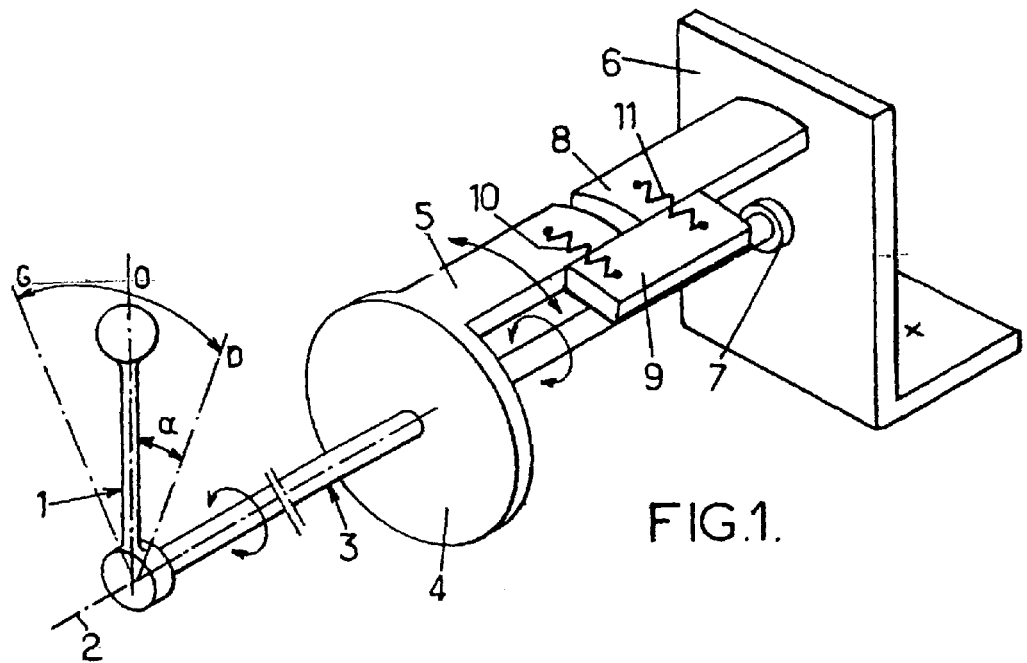
FIG. 1 is a highly diagrammatic perspective view of a device arranged in accordance with the invention.
Figure 2:
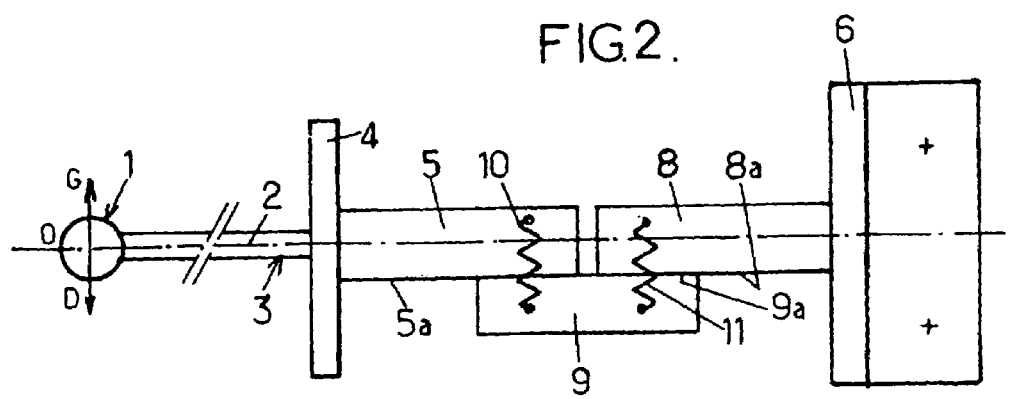
FIG. 2 is a plan view of the FIG. 1 device shown in a first functional position.

FIGS. 1 and 2 are referred to initially and show in highly diagrammatic form the component elements of a base structure for a device for artificially restoring an opposing force that is to be functionally associated with a device for remotely controlling airplane control surfaces and arranged in accordance with the invention. It should be stated at this point that the remote control portion proper does not come within the field of the invention and is therefore not shown, and only those elements or portions that are concerned by the invention are shown, namely the actuator member and the elements or portions specific to artificially restoring the opposing force when the operator (the pilot of the aircraft) moves the actuator member angularly in order to be able to act on a control surface of the aircraft, on the assumption that said control does not present its own opposing force (as is the case for an electrical control, for example).

Under such conditions, the pilot has available an actuator member 1 that may be a pedal or a control column or stick. The stick 1 is movable in pivoting about an axis 2 while entraining controls for respective control surfaces and also a shaft 3 of the force restoring device, which shaft 3 may lie on said axis 2, as shown in the example of FIG. 1, or may be parallel thereto. The shaft 3 is secured to a surrounding end plate 4, e.g. carrying at its periphery or in the vicinity of its periphery a drive (or first) finger 5 extending parallel to the shaft 3.

A stationary frame portion, represented in the form of a stationary end plate 6, supports the end of the shaft 3 in a bearing 7 and also supports a stationary (or second) finger 8 that extends parallel to the shaft 3. In the preferred embodiment shown in FIGS. 1 and 2, the finger 8 is situated in register with the moving finger 5 when the device is in the neutral position as shown in FIG. 1, and as described below.

A slab 9 is situated on one side of the two fingers 5 and 8, facing both of them simultaneously. In the position shown in FIGS. 1 and 2, the slab 9 has its edge 9a that faces towards the respective facing edges 5a and 8a of the two fingers 5 and 8 shaped in such a manner as to come into contact with said edges of the fingers. In a simple embodiment, the edges of the fingers 5 and 8 that face towards the slab 9 are in mutual alignment such that the corresponding edge of the slab 9 is an edge that is substantially rectilinear. The slab 9 may be supported in any desirable manner (by slideways, a rotary arm hinged to the shaft 3, . . . ) so as to be capable of turning about the shaft 3 at a distance therefrom.

A first return spring 10 is secured to the first finger 5 and to the slab 9, and a second return spring 11 is secured to the second finger 8 and to the slab 9 (in FIGS. 1 and 2, the two return springs 10 and 11 are represented diagrammatically as respective helical springs extending transversely).

In the absence of any force exerted on the stick 1 (rest position or neutral position referenced 0 and shown in FIGS. 1 and 2), the two springs 10 and 11 prestress the fingers 5 and 8 so as to come into contact with the slab 9.

From the above, it will be understood that implementing the above-described structure with prestress being conferred on the springs leads to a complete absence of slack, thereby ensuring that the device is very reliable.

Figure 2A:
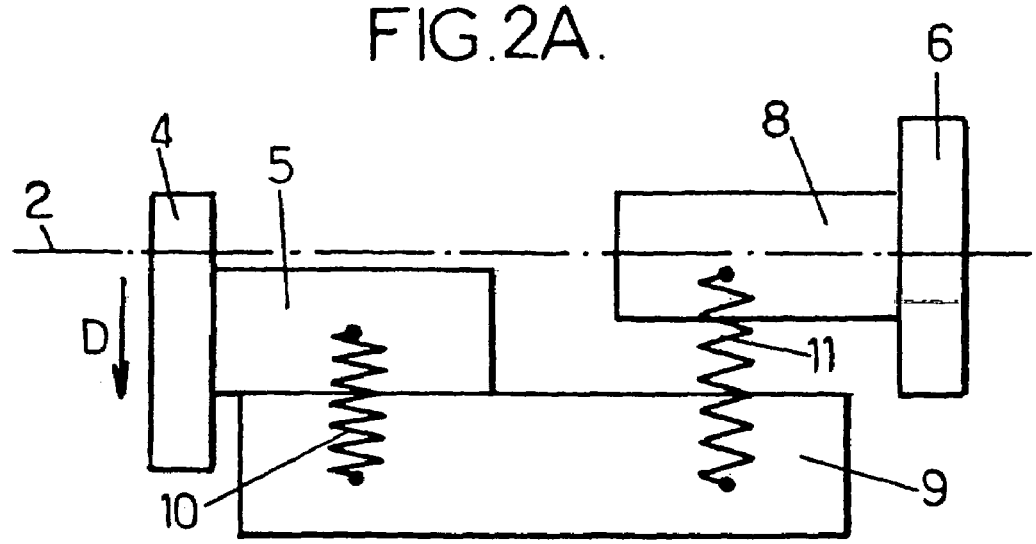
FIGS. 2A and 2B are simplified views analogous to that of FIG. 2, showing respectively two other functional positions.

If the stick 1 is deflected, e.g. to the right (D in FIGS. 1, 2, and 2A), the moving finger 5 secured to the end plate 4, itself secured to the shaft 3, is moved transversely relative to the axis 2; it entrains the slab 9 and moves it away from the stationary finger 8 against the return force from the spring 11 (FIG. 2A).

Figure 2B:
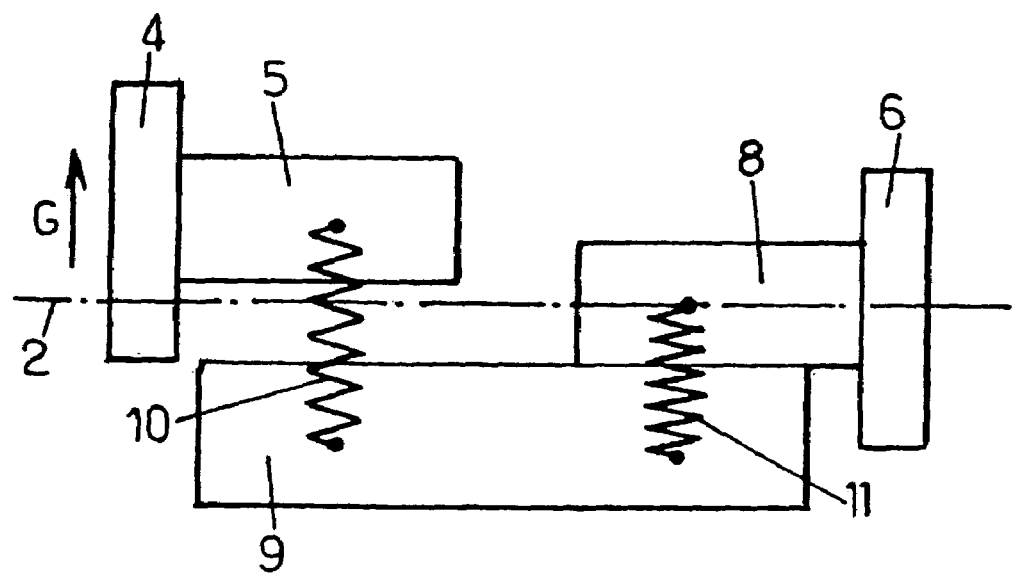

If the stick 1 is now deflected to the left (G in FIGS. 1, 2, and 2B), the moving finger 5 is moved by the end plate 4, but without entraining the slab 9, which remains blocked by the stationary finger 8; as a result the moving finger 5 is moved transversely relative to the axis 2 against the return force of the spring 10 (FIG. 2B).

Figure 4:
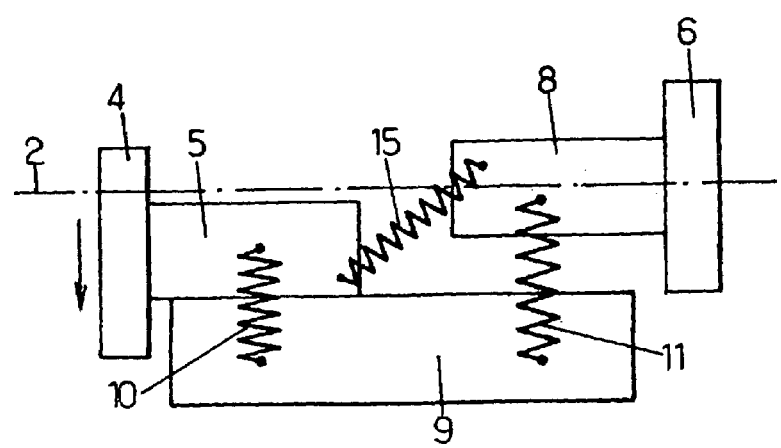
FIG. 4 is a simplified view analogous to that of FIG. 2A showing a variant embodiment.

In FIGS. 2A and 2B (and also below in FIG. 4), the angular displacements of the moving finger 5 and of the slab 9 are represented by linear displacements.

The device in accordance with the invention as described above finds a most particular, although non-exclusive, application in controlling the roll (banking) control of an aircraft wing using a stick of the so-called "mini-stick" type, said control being obtained by moving the mini-stick angularly in a plane extending transversely to the axis 2, as shown in FIG. 1, i.e. from right to left or from left to right. With a mini-stick, the forearm of the operator rests on an armrest and the rotary movements of the wrist to the right or to the left are not symmetrical because the wrist presents ergonomic asymmetry in terms of force, which can result in the roll control of the wing running the risk of not being performed symmetrically to the right and to the left.

By using the device arranged in accordance with the invention, it is possible in simple manner to remedy this drawback by implementing two springs 10 and 11 having stiffnesses that are different. The response curve of the device is then asymmetrical, as can be seen clearly in FIG. 5A where force F is plotted up the ordinate and angular displacement α of the mini-stick 1 is plotted along the abscissa. The slope of the straight line segment $d_{11}$ situated on the right, representing the stiffness of the spring 11, is not as steep as the slope of the straight line segment $d_{10}$ situated on the left, representing the stiffness of the spring 10.

Figure 5A:
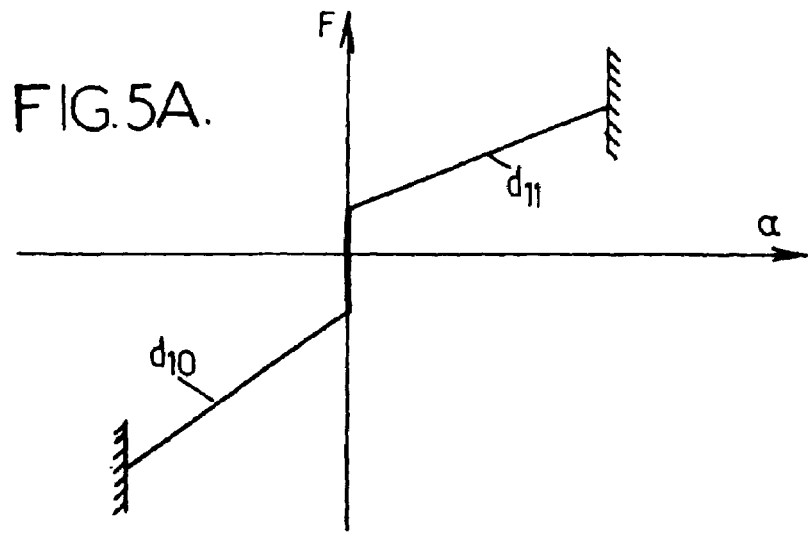
FIGS. 5A, 5B, and 5C are graphs plotting response curves that can be obtained with various embodiments of devices in accordance with the invention.
Figure 5B:
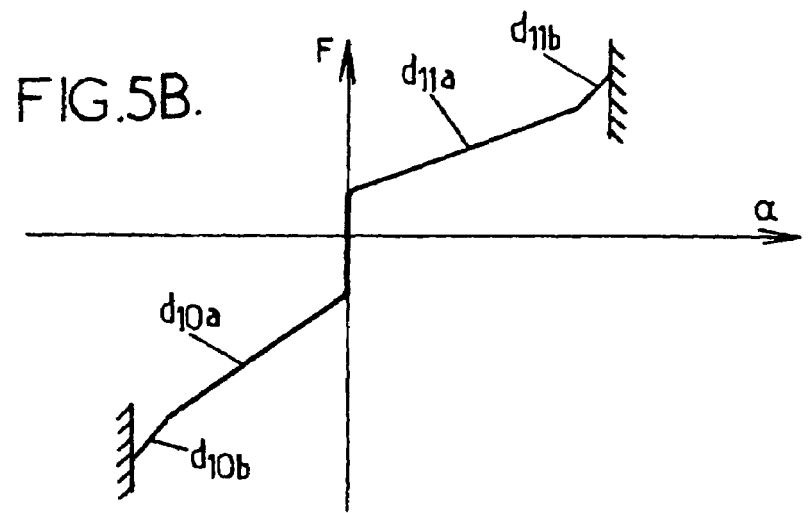
Figure 5C:
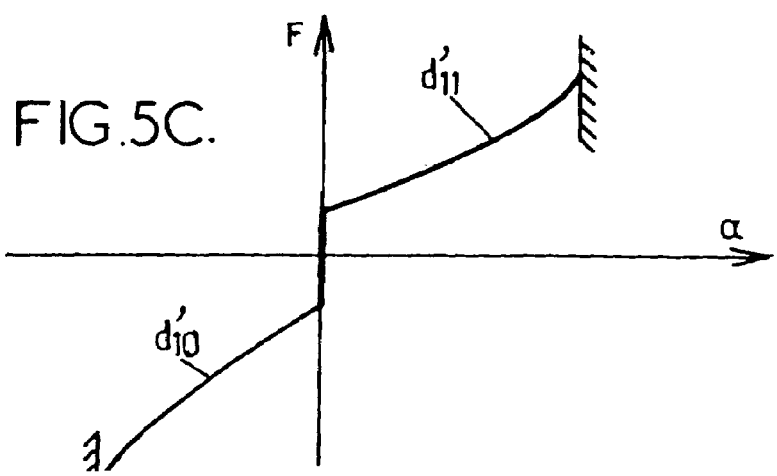

It will also be understood that the arrangement in accordance with the invention makes it possible to provide response curves of any desirable shape, i.e. not only response curves presenting slopes that are not equal, as shown in FIG. 5A, but also, where so desired for specific applications, response curves presenting a plurality of unequal slopes as shown in FIG. 5B at $d_{11a}$ & $d_{11b}$ and at $d_{10a}$ & $d_{10b}$, or even response curves that are at least in part curvilinear with unequal degrees of variation, as shown in FIG. 5C at $d'_{11}$ and $d'_{10}$. The person skilled in the art knows how to obtain such response curves, e.g. by a structural assembly of springs having different stiffnesses, by using springs with characteristics that are not constant, . . . .

In a preferred embodiment of the invention, the springs 10 and 11 are made in the form of torsion springs, advantageously in the form of helical springs disposed one after the other and coaxially surrounding the shaft 3.

To make the device simpler to assemble, it is advantageous to design the assembly constituted by the two springs 10 and 11 and the slab 9 in the form of a preassembled unitary assembly that is put into place as a unit.

A preferred way for the implementation of said last feature consists in providing for the slab 9 and the two springs 10, 11 to be made as a single block of spring steel, with the springs 10 and 11 being machined in the block.

Figure 3:
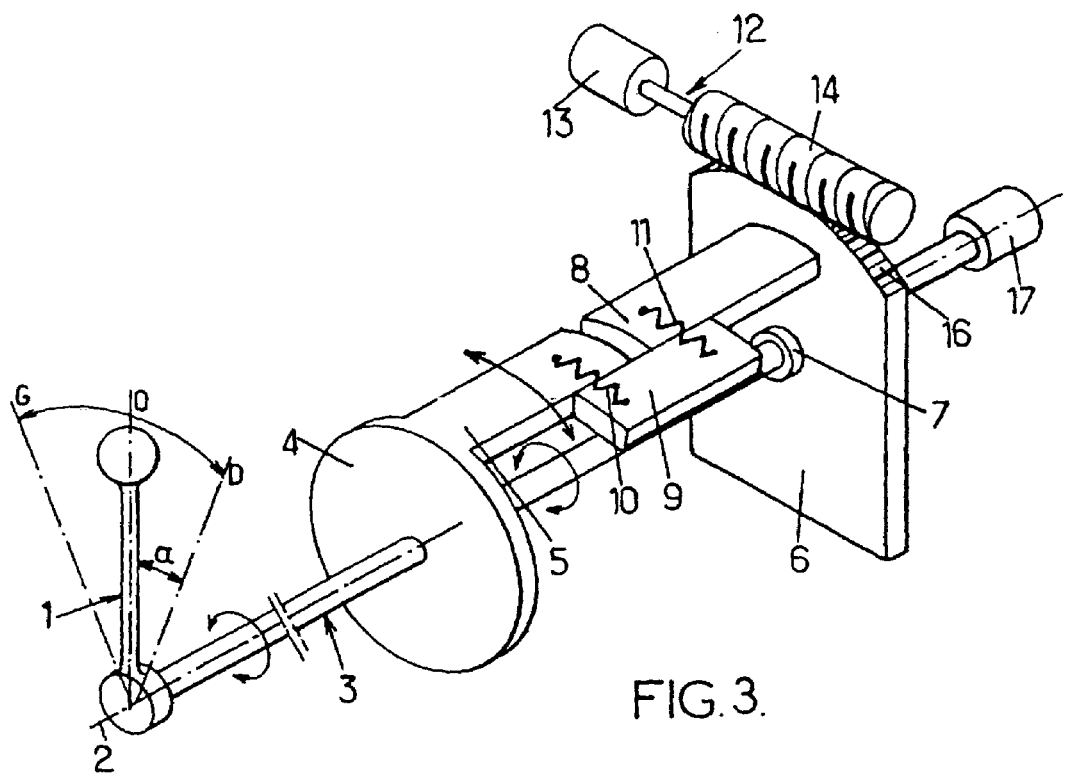
FIG. 3 is a view analogous to the view of FIG. 1 showing a variant embodiment that is motor-driven.

The above-described arrangement for the device in accordance with the invention makes it possible to envisage a motor-driven version that is safe. Direct motor drive to the actuator member 1 might turn out to be unsatisfactory because it would need to be capable of overcoming the prestress forces of the spring, and also it might not be safe in the event of a motor breakdown of the type in which the motor operates in random manner. However an advantageous solution consists in moving the neutral position reference, in other words applying motor drive to the position reference finger 8. For this purpose, and as shown in FIG. 3, it is possible to envisage implementing the end plate 6 in moving form, i.e. mounting it to pivot about the shaft 3. As shown in FIG. 3, a simple embodiment could consist in providing displacement means 12 for moving the end plate 6, which displacement means 12 could comprise a motor 13 driving a wormscrew 14 meshing with a toothed edge 16 of the end plate 6 that is secured to the finger 8, the toothed edge being rounded about the axis of the shaft 3. In desirable manner, an angular position sensor 17 that is functionally associated with the shaft 3 (e.g. secured on the shaft 3) should be included in a position-indicator circuit.

Such an arrangement with a motor-driven finger 8 activates the actuator member 1 by moving the position reference, and thus enables said member 1 to operate in active manner so that in autopilot mode (or when it constitutes a second stick that is not in use) it can follow the maneuvers of the aircraft as controlled by a computer or by the pilot (when the stick is in the co-pilot's stick). Such a structure is safe since in the event of the motor operating in random manner, it is possible to take over due to the force relationships of the springs, and the pilot can counter the unwanted movements due to the motor.

It can clearly be seen from the above description that in the preferred application of the device in accordance with the invention, the actuator member is a manually-actuatable knob or stick 1, in particular of the mini-stick type that can be operated by turning the wrist to the right or to the left from a central neutral position in order to control the roll control surfaces of the aircraft wing.

In particular in this more specifically envisaged preferred application, in order to provide safety in the event of the part 13 breaking (e.g. one of the springs 10, 11) which would leave the stick 1 loose, it is possible to provide resilient coupling between the two fingers 5 and 8, which coupling is independent of the slab 9. For this purpose, it is possible to envisage providing an additional spring 15 between the fingers 5 and 8, as shown diagrammatically in FIG. 4: the additional spring 15 mounted diagonally between the two fingers 5 and 8 generates a transverse return force component tending to urge the two fingers into the mutual situation that they occupy when the device is in the neutral position. The spring 15 may be of low stiffness so as to avoid interfering with normal operation of the device.

The invention claimed is:

1. A device for artificially restoring opposing force for a device for remotely controlling aircraft control surfaces, said device comprising an actuator member suitable for pivoting about an axis while entraining a rotary shaft, comprising:
   a stationary, first finger parallel to said shaft and supported at a radial distance from said shaft;
   a second finger secured to said rotary shaft and parallel thereto, said second finger being supported at substantially the same radial distance from said shaft as the first finger;
   a slab supported at the same radial distance as the first and second fingers and extending beside the two fingers;
   a first spring interposed between the stationary, first finger and the slab; and
   a second spring interposed between the moving, second finger and the slab; wherein the device occupies three functional positions, namely:
   a neutral position occupied in the absence of any force being exerted on the actuator member, in which the slab is held pressed laterally simultaneously against both fingers under the action of prestress of the two springs;
   a position pivoted in a first direction away from the neutral position through a variable angle (.alpha.), in which the moving, second finger is entrained relative to the stationary, first finger away from the slab and is subjected to the return force of the second spring interposed between said second finger and the slab; and
   a position pivoted in a second direction, opposite to the preceding direction, away from the neutral position through a variable angle (.alpha.), in which the moving, second finger is entrained relative to the stationary, first finger to the same side as the slab, entraining it therewith, and is subjected to the return force from the first spring interposed between the first finger and the slab.

2. The device according to claim 1, wherein the two springs have stiffnesses that are different.

3. The device according to claim 1, wherein at least one of the springs has stiffness that is variable as a function of its deformation.

4. The device according to claim 1, wherein the two springs are torsion springs disposed coaxially around the shaft.

5. The device according to claim 4, wherein the two springs are helical springs.

6. The device according to claim 1, wherein the slab and the two springs situated on either side thereof are constituted in the form of a unitary assembly.

7. The device according to claim 1, wherein the slab and the two springs situated on either side thereof are constituted in the form of a single block, the springs being machined in the block.

8. The device according to claim 1, wherein the first and second fingers are substantially in mutual alignment when in the neutral position.

9. The device according to claim 1, wherein the actuator member is a manually-actuatable knob or stick.

10. The device according to claim 9, wherein the actuator member is of the so-called mini-stick type.

11. A device according to claim 1, wherein the device includes motor-driven displacement means functionally associated with the stationary finger and is suitable for modifying the position of the stationary finger.

12. The device according to claim 1, wherein the device is operatively coupled to a system for controlling the roll control surfaces of the wing of the aircraft.

* * * * *